Dec. 6, 1966                FRITZ STEINER              3,290,685
              ALSO KNOWN AS FRIEDRICH STEINER
         OMNI-RANGE DOPPLER BEACONS AND DIRECTION FINDING SYSTEMS
Filed March 6, 1964                                3 Sheets-Sheet 1

INVENTOR
FRITZ STEINER

BY
         ATTORNEY

Dec. 6, 1966  FRITZ STEINER  3,290,685
ALSO KNOWN AS FRIEDRICH STEINER
OMNI-RANGE DOPPLER BEACONS AND DIRECTION FINDING SYSTEMS
Filed March 6, 1964  3 Sheets-Sheet 2

INVENTOR
FRITZ STEINER

BY *[signature]*
ATTORNEY

Dec. 6, 1966        FRITZ STEINER            3,290,685
        ALSO KNOWN AS FRIEDRICH STEINER
    OMNI-RANGE DOPPLER BEACONS AND DIRECTION FINDING SYSTEMS
Filed March 6, 1964                         3 Sheets-Sheet 3
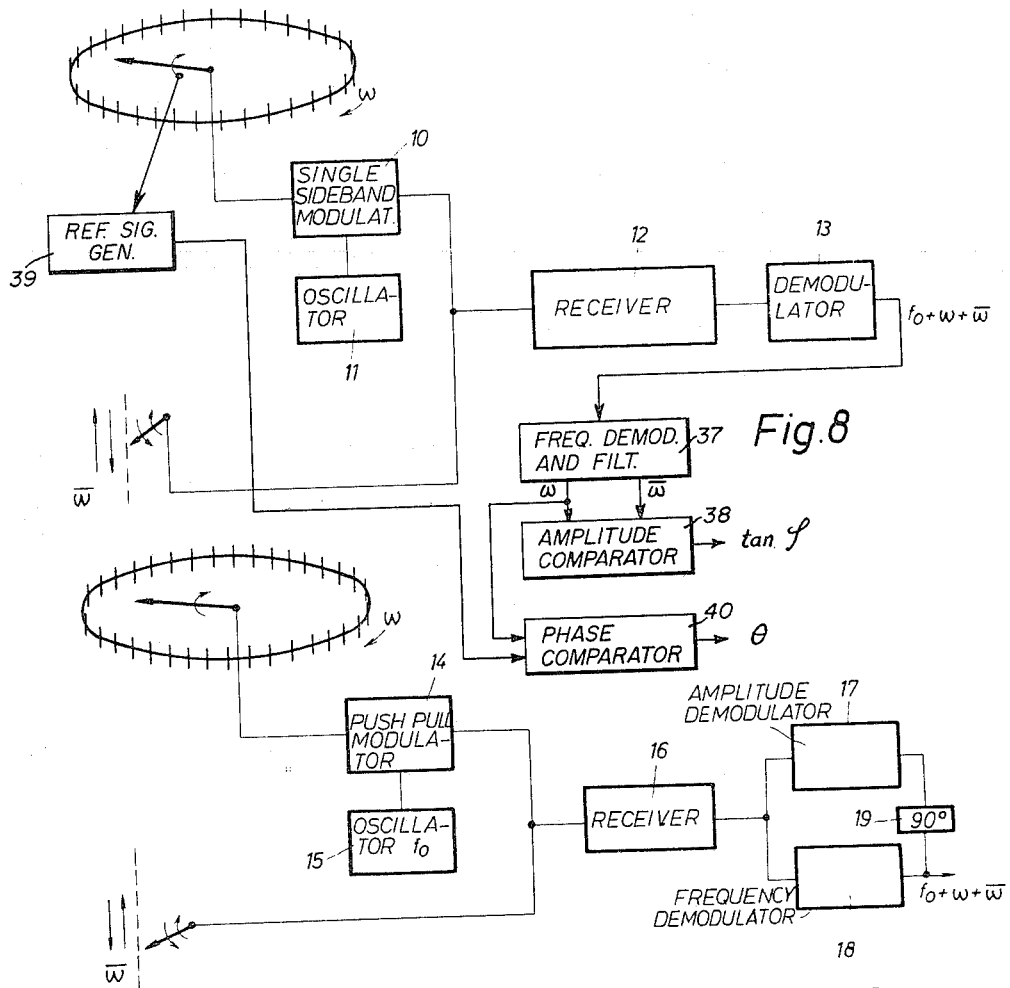
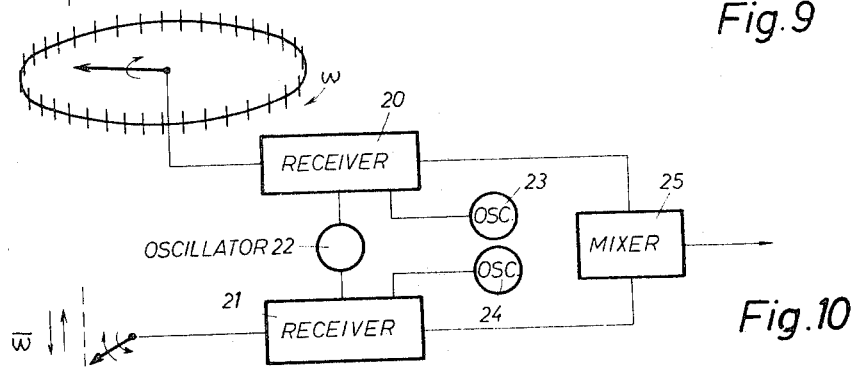
INVENTOR
*FRITZ STEINER*
BY
ATTORNEY 3,290,685
OMNI-RANGE DOPPLER BEACONS AND DIRECTION FINDING SYSTEMS
Fritz Steiner, also known as Friedrich Steiner, Pforzheim, Germany, assignor to International Standard Electric Corporation, New York, N.Y., a corporation of Delaware
Filed Mar. 6, 1964, Ser. No. 350,039
Claims priority, application Germany, Mar. 9, 1963, St 20,387
7 Claims. (Cl. 343—106)

The invention relates to a radio beacon navigation system particularly suitable for helicopter-type and V/STOL aircraft. It is constructed in such a way that the elevation angle ($\varphi$), the azimuth ($\theta$) and, by interrogation method, also the distance ($\rho$) can be found aboard the aircraft, i.e. the position of said craft in spherical co-ordinates with reference to the location of the radio beacon or to the center of the landing field respectively. To supervise the air-traffic in a central ground-station these values are suitably transmitted from the aircraft to the ground-station by means of a method known to the art. For an easier evaluation the position values measured in spherical coordinates are converted into Cartesian coordinates. The conversion of coordinates in the pertinent facilities is known per se and is not within the scope of this invention.

The distance (so-called slant distance) $\rho$, required to determine a point in space, together with the azimuth and the elevation angle, is found as known in the interrogation method either from ground—as is conventional—or from aboard the aircraft. A system in which the distance measuring pulse is simultaneously utilized for data transmission is disclosed in the copending U.S. patent application of F. Steiner et al. for "Method of Transmitting Information Within a Continuous Wave Train by Means of a Serial Code" filed June 3, 1963, and bearing Serial No. 284,930. The respective aircraft is interrogated from ground with its identification signal and reradiates said signal. The time between emission and re-entering of said signal at the ground station gives the distance in a way known to the art.

An object of this invention is to provide an improved means to determine the azimuth and elevation angle of an aircraft.

This invention provides an omni-range Doppler radio navigation system having a reference signal which comprises means to simulate the motion of a single antenna across several wavelengths in a vertical direction at a first frequency, means to simulate the motion of a single antenna in a circle having a diameter of several wavelengths at a second frequency so that the electromagnetic wave energy at said first and second antenna means is frequency modulated with said first and second frequencies, means to determine azimuth by comparison of the frequency modulation of said antenna rotation and the reference signal and means to determine the angle of elevation by the ratio of the frequency deviations of said first and second frequencies.

The above-mentioned and other features and objects of this invention will become more apparent by reference to the following description taken in conjunction with the accompanying drawings, in which:

FIGURE 8 is a direction finding receiver utilizing scanned circular and linear antenna arrays;

FIGURE 9 is another embodiment of a direction finding receiver utilizing scanned circular and linear antenna arrays; and FIGURE 10 is still another embodiment of a direction finding receiver using scanned circular and linear antenna arrays.

Figure 1:
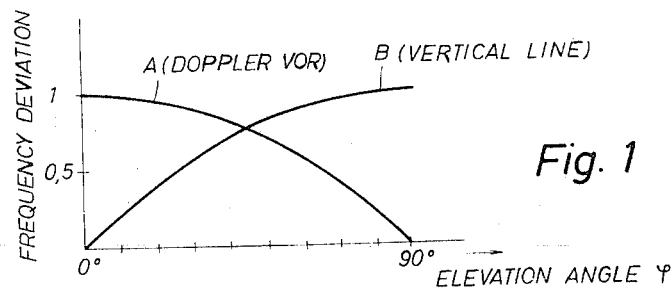
FIGURE 1 is a graph of frequency versus elevation angle.
Figure 2:
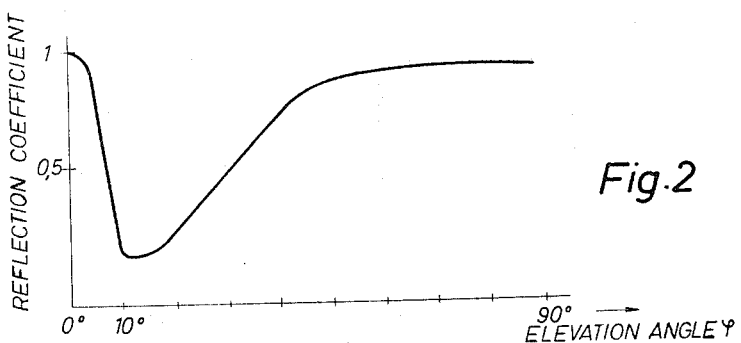
FIGURE 2 is a graph of reflection coefficient versus elevation angle.
Figure 3:
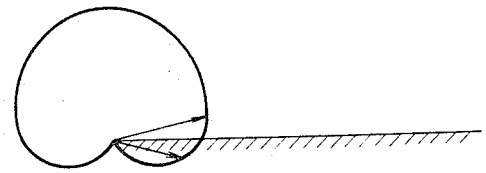
FIGURE 3 is a radiation diagram of a cardioid.

The direction $\theta$ can be determined for example with a Doppler-VOR. The Doppler-VOR renders, in addition to the direction $\theta$, a coarse information on the elevation angle $\varphi$ by the magnitude of the frequency deviation investigated. The frequency deviation decreases with the cosine of the elevation angle, as is known. A coarse information on the elevation angle $\varphi$ is obtained in the Doppler-VOR by measuring the frequency deviation. For precision measuring a vertical-component is necessary which is in proportion to the sine of the angle $\varphi$. This can be achieved by scanning a vertical line. Assuming that the ground reflection effects can be neglected the scanning of a vertical line renders a frequency deviation which changes with the sine of the elevation angle. By plotting the frequency deviation as a function of the elevation angle in a diagram (FIGURE 1) the curve A of FIGURE 1 is obtained by a Doppler-VOR and from the vertical line the curve B of FIGURE 1. From the ratio of both values the elevation angle is obtained with sufficient exactitude. It can be evaluated by means of a resolver, operated through a servo-motor, both fixed coils of said resolver are fed with A.C.-voltages and with the amplitudes according to curves A and B, respectively. The rotor is then set in such a direction that the voltage at the rotor winding becomes zero. The angle set is then the elevation angle $\varphi$. Ground influences can be eliminated to a far-reaching extent by various measures or combinations of said measures:

(1) By vertical polarization of the radiated waves using the Brewster's angle (FIGURE 2). In FIGURE 2 the reflection coefficient is plotted against the elevation angle. The reflection coefficient is considerably reduced at small angles, at approximately 10° (depending on the frequency) it represents a minimum, and thereafter increases again.

(2) By emitting the high frequency waves in the radiation diagram of a cardioid, which is produced by simultaneous feeding of two vertical dipoles arranged above each other with currents shifted by 90° in phase.

Figure 4:
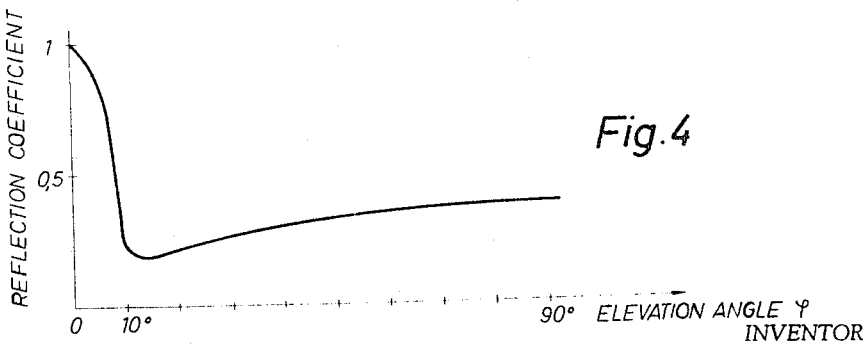
FIGURE 4 is another graph of reflection coefficient versus elevation angle.

By combination (multiplication) of both methods to decrease the influence of the ground on the radiation of the waves from the antennas a reflection characteristic is obtained as shown in FIGURE 4. It can be seen that at radiation angles which are larger than approximately 10°, the reflection coefficient can be kept always less than 0.5. By using the Capture-effect known with a wide base system in which the ratio of the diameter of the antenna system (D) to the wave length ($\lambda$) is about 10 the measuring accuracy can be kept smaller than 1°, as it is already known. The method can be realized in practice in different manners and with different configurations of antenna arrays:

(1) By means of a circular antenna array as it is known from Doppler omni-directional radio beacons and by a vertical, linear antenna array which can be set up in the center of a circular array. Both antenna arrays have for example vertical, bent dipoles so that the radiated waves are essentially polarized in the vertical direction, but nevertheless also vertical radiation is obtained. The circular antenna array is fed cyclically with a high-frequency wave of the frequency $F_h$ as it is known from Doppler radio beacons, and scanned with a frequency $\omega_2$; the linear antenna array is fed with a high frequency wave $(F_h + \Delta f)$ and scanned with a frequency $\omega_1$.

Figure 5:
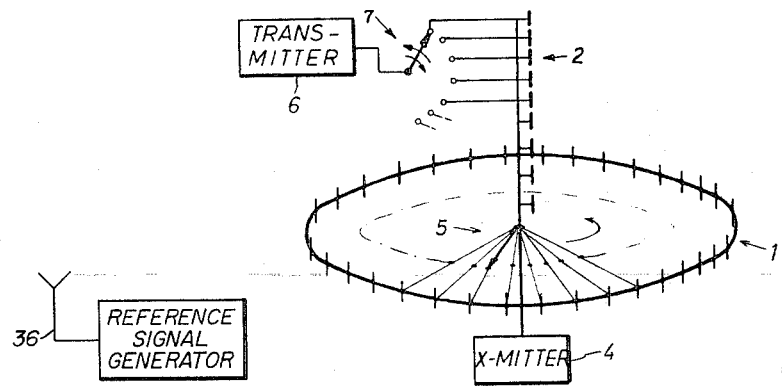
FIGURE 5 is a diagram of a transmitting ground station utilizing circular and vertical antenna arrays.

This embodiment is shown in FIGURE 5 with a circular antenna array 1 in the center of which is disposed a vertical antenna array 2. The output of transmitter 3 is coupled to the circular antenna array 1 by means of switching means 5, and the output of transmitter 6 is coupled to the vertical antenna array 2 by switching means 7.

A receiving device which receives both radio-frequency waves furnishes, after an amplitude demodulation, a beat frequency $\Delta f$ which is frequency-modulated with $\omega_1$ and $\omega_2$ simultaneously. The modulation deviation of $\omega_1$ increases with the sine of the elevation angle $\varphi$, whereas the one of $\omega_2$ decreases with the cosine of the elevation angle $\varphi$. After a frequency demodulation of the frequency $\Delta f$ and successive filtering, the voltages of the frequency $\omega_1$ and $\omega_2$ are obtained separately. The ratio of both voltage magnitudes results in the tangent of angle of elevation $\varphi$. The voltage phase of the frequency $\omega_2$ compared with a reference voltage of the same frequency $\omega_2$, transmitted in a way known to the prior art (for example, using another antenna 36), results in the direction $\theta$.

(2) In another example the antenna array is designed in such a way that a circular motion and an up- and downward motion of an individual radiator is combined. To this end a number of bent, vertical dipoles are arranged on an ellipse which is obtained by intersecting a cylinder with an oblique plane to the cylinder's axis. These dipoles are scanned with a frequency $\omega_3$ and the cylinder rotates with a velocity which corresponds to a frequency $\omega_4$. Then the scanning frequency $\omega_2$ from the first example corresponds to the sum of $\omega_3$ and $\omega_4$, if scanning and rotation are synonymous or in the same direction. For the up- and downward motion only the scanning frequency $\omega_3$ is important. This scanning frequency corresponds to the frequency $\omega_1$ of the first example. When using such an antenna array which is fed with the frequency $F_h$ and scanned and rotated as described it is useful, but in principle unnecessary, for a receive end evaluation to radiate a frequency $(F_h + \Delta f)$ from a further fixed antenna. The waves are then received as described in the first example.

Figure 6:
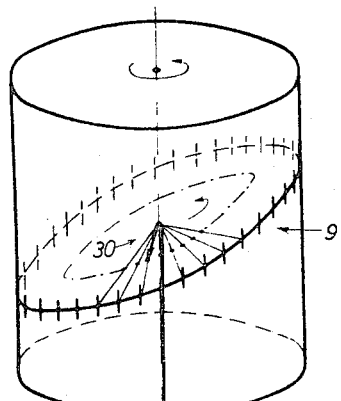
FIGURE 6 is a diagram of a transmitting station using an elliptical antenna array.

This example is disclosed in FIGURE 6 where a transmitter 8 is coupled to an elliptical antenna array 9 by means of switching means 30.

(3) In a further embodiment of the antenna array three ellipses are provided on a cylindrical surface each ellipse consisting of an antenna array with a number of bent, vertical dipoles. These ellipses stand towards the vertical axis of the cylinder under the same intersecting angle, the major axes of the ellipses, however, have a mutual angle distance of 120° measured in the projection onto a horizontal plane. The cylinder itself is fixed, contrary to the embodiment mentioned in the second example. The three antenna arrays are scanned in a timely succession, each individually in the way described above so that a jerky motion by always 120° is the result, if the transition from one antenna array to the next following is made.

Figures 7A, 7B, 7C:
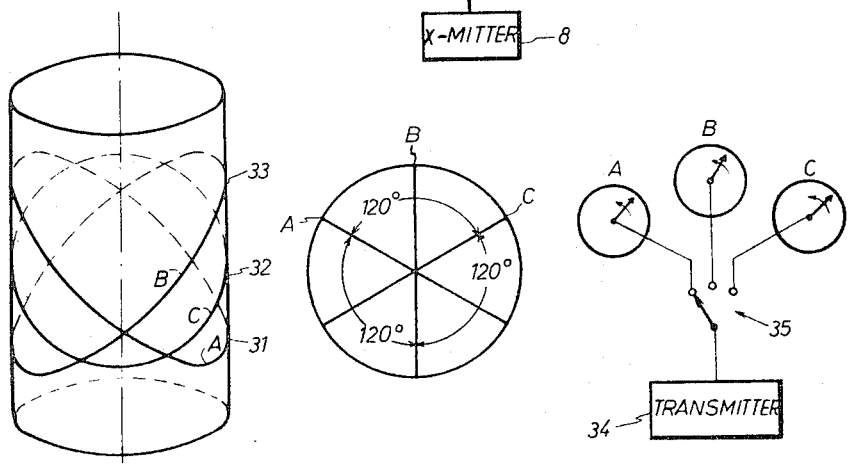
FIGURES 7a, 7b and 7c are diagrams showing a plurality of elliptical arrays and a transmitting station utilizing said arrays.

This embodiment is shown in FIGURES 7a, 7b and 7c where three elliptical arrays 31, 32 and 33 disposed as described above with a transmitter 34 coupled to the three antennas by coupling means 35.

To transmit the reference frequency necessary for phase measuring ($\theta$) and for the frequency processing on the receive end known methods can be used in which the reference frequency is impressed on an existing or on another carrier and is demodulated and filtered correspondingly at the receiving end. The phase will be measured with means also known.

The construction of receiving systems cooperating in a so designed radio beacon is relatively simple. The signals received by an antenna are converted in a conventional way with regard to the frequency, amplified and amplitude demodulated. The beat frequency $\Delta f$ formed thereby is limited, frequency demodulated, and the output is filtered. Thereby one obtains the frequency $\omega_1$ with the amplitude $A = p \times \text{sine } \varphi$ and the frequency $\omega_2$ with the amplitude $B = q \times \text{cosine } \varphi$. With the relation $$A/B = p/q \times tg\varphi$$

the elevation angle is obtained. The voltage phase of frequency $\omega_2$ results in the azimuth angle $\theta$ when compared with the reference frequency of the same frequency $\omega_2$ transmitted and processed on the receiving end in the way known.

The principles of the radio navigation method herein described for the transmitting end can be applied in the same sense for the receiving end, i.e. for use as a direction finder as is well known in the art.

For the direction-finder station also three variants in the construction are possible using the aforedescribed antenna arrays.

(1) According to FIGURE 8 the waves of the frequency $F_o$, received by the circular antenna array which is scanned with the frequency $\omega$, are converted in a single sideband modulator 10 with a low-frequency voltage $f_o$ which is furnished by an oscillator 11 (approximately 10 kc./s.) into a frequency $F_o + f_o$, and led to the input of a receiver 12, whereas the waves received by the linear antenna array, scanned with the frequency $\bar{\omega}$, are directly led to the receiver 12. The two frequencies $F_o$ and $F_o + f_o$ are amplified in the receiver 12, converted into an intermediate frequency, and thereupon amplitude-demodulated in a demodulator 13. Thereby the frequency $f_o$ is gained which is simultaneously frequency-modulated with the two scanning frequencies $\omega$ and $\bar{\omega}$ of the antenna arrays. After a frequency demodulation and the following filtering at 37 the scanning frequencies $\omega$ and $\bar{\omega}$ are obtained. The ratio of their amplitudes taken at 38 results in the tangent of elevation angle $\varphi$. A phase comparison at 40 of the voltage of frequency $\omega$ with a reference voltage of same frequency, derived in a way known from the antenna rotation at 39, results in the azimuth $\theta$.

(2) The voltage of the circular antenna array is converted by a push-pull modulator 14 with a low-frequency ($f_o$) of about 10 kc./s. of an oscillator 15 and led to the input of the receiver (FIGURE 9). The waves received by the linear antenna systems are directly led to the input of the receiver 16. The output voltage of the receiver 16 is amplitude-demodulated in a component 17 and frequency-demodulated in a component 18; the voltage obtained by the amplitude demodulation is phase-shifted by 90° as compared with the voltage obtained by the frequency demodulation. Therefore the amplitude-demodulated voltage is phase-shifted by 90° in a phase-shifting device 19 prior to combining it with the frequency-demodulated voltage. The result of this combination is, like explained in Example 1, a voltage of the frequency $f_o$, frequency-modulated with $\omega$ and $\bar{\omega}$. This voltage is further processed in the same way as described in Example 1 in order to obtain the tangent of elevation angle $\varphi$ and the azimuth $\theta$.

(3) The two voltages received in the antenna arrays are fed as shown in FIGURE 10 to separate receivers 20 and 21, respectively and converted in their frequency with a common, first oscillator 22. The output voltages of both receivers, equal in their frequency, are furthermore converted with two separate oscillators 23 and 24 respectively, their frequencies differing by an amount $f_o$, into frequencies differing by $f_o$ and these output voltages are mixed in a mixer stage 25. The result is a voltage of the frequency $f_o$ which again is frequency-modulated with $\omega$ and $\bar{\omega}$. Further processing of this voltage is made in the same way as described in Example 1.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In an omni-range Doppler radio navigation system, a beacon from which an aircraft can derive its azimuth and elevation angles, comprising first means to stimulate the motion of a single antenna across several wavelengths in a vertical direction at a first frequency, means for exciting said first means with a first RF energy, second means to simulate the motion in a horizontal direction of a single antenna in a circle having a diameter of several wavelengths at a second frequency, means for exciting said second means with a second RF energy, so that the RF energy at said first and second means is frequency modulated at said first and second frequencies, and third means for transmitting a reference signal, whereby azimuth is derived at an aircraft by comparing the phase position of the frequency modulation from said second means with said reference signal, and angle of elevation is derived at an aircraft by the ratio of the frequency deviations of said first and second frequencies.

2. A radio navigation system according to claim 1, wherein said first and second sources of RF energy differ in their frequency by the amount $\Delta f$.

3. In an omni-range Doppler radio navigation system, a beacon from which an aircraft can derive azimuth and elevation angles, comprising a plurality of antennas, means disposing said antennas in at least one ellipse which is formed by the intersection of an imaginary vertical right circular cylinder in a plane oblique to the axis of said cylinder, a source of RF energy, switching means coupling said source of RF energy successively to each said antennas at a first frequency, and means to rotate said array around the vertical axis of said cylinder at a second frequency whereby a combination of upward and downward motion with a rotating motion is achieved and the resultant rotational frequency is equal to the sum of said switching frequency and said second frequency, said RF energy being frequency modulated with said first and second frequencies.

4. A radio navigation system according to claim 3 comprising a plurality of elliptical antenna arrays which are positioned on intersecting ellipses which are obtained by the intersecting planes of the same inclination towards the axis of an imaginary vertical right circular cylinder, and the ellipses are distributed in equal angular spacing around said cylinder, and switching means to feed said RF energy successively to each said antenna of said elliptical arrays, whereby the individual antennas of each antenna array is cyclically excited and said RF energy is frequency modulated with two carrier frequencies.

5. A direction finding system for determining the azimuth and elevation angle of a source of radiations, comprising first means to simulate the motion of a single antenna across several wavelengths in a vertical direction at a first frequency, means to simulate the motion in a horizontal direction of a single antenna in a circle having a diameter of several wavelengths at a second frequency so that the electromagnetic wave energy received at said first and second antenna means from a source of radiation is frequency modulated with said first and second frequencies, means to generate a reference signal at said second frequency, means to modulate the frequency modulated wave energy from at least one antenna means with a low frequency signal, means to combine said low frequency modulated wave energy from said antenna means and the output of said other antenna means, means to demodulate said combined signals and to derive as the result thereof modulation components corresponding to said first and second frequencies, means to derive the ratio of said modulations to determine the elevation angle of said source and means to compare the modulation frequency corresponding to said second frequency with said reference signal of the same frequency derived from the rotation of said second antenna means to determine the azimuth of said source.

6. A direction finding system according to claim 5 wherein the frequency modulated wave energy from said second antenna means is modulated with said low frequency signal.

7. A direction finding system according to claim 5 where-in both frequency modulated signals from said first and second antenna means are modulated with said low frequency signal.

References Cited by the Examiner

UNITED STATES PATENTS

| 3,136,997 | 6/1964 | Lucanera et al. | 343—106 X |
| 3,234,553 | 2/1966 | Steiner | 343—108 |
| 3,234,554 | 2/1966 | Earp et al. | 343—106 X |
| 3,248,732 | 4/1966 | Mahler | 343—106 |

CHESTER L. JUSTUS, *Primary Examiner.*

H. C. WAMSLEY, *Assistant Examiner.*